United States Patent
Woo et al.

(10) Patent No.: US 8,989,768 B2
(45) Date of Patent: Mar. 24, 2015

(54) METHOD OF DETERMINING A POSITION IN A WIRELESS COMMUNICATION SYSTEM AND APPARATUS THEREOF

(75) Inventors: Kyungsoo Woo, Anyang-si (KR); Sukhyon Yoon, Anyang-si (KR); Hyowon Bae, Anyang-si (KR); Seunghee Han, Anyang-si (KR); Hyungsung Jung, Anyang-si (KR); Joonseok Maeng, Anyang-si (KR)

(73) Assignee: LG Electronics Inc., Seoul (KR)

( * ) Notice: Subject to any disclaimer, the term of this patent is extended or adjusted under 35 U.S.C. 154(b) by 810 days.

(21) Appl. No.: 13/183,317

(22) Filed: Jul. 14, 2011

(65) Prior Publication Data

US 2012/0015667 A1   Jan. 19, 2012

Related U.S. Application Data

(60) Provisional application No. 61/364,818, filed on Jul. 16, 2010.

(30) Foreign Application Priority Data

Mar. 25, 2011   (KR) ........................ 10-2011-0026815

(51) Int. Cl.
*H04W 24/00* (2009.01)
*G01S 5/02* (2010.01)
(Continued)

(52) U.S. Cl.
CPC ............. *G01S 5/0221* (2013.01); *G01S 5/0236* (2013.01); *G01S 5/10* (2013.01); *H04W 24/10* (2013.01); *H04W 48/16* (2013.01); *H04W 64/00* (2013.01)
USPC .................................... 455/456.1; 455/456.5

(58) Field of Classification Search
USPC .......................... 455/403–404.2, 456.1–456.6
See application file for complete search history.

(56) References Cited

U.S. PATENT DOCUMENTS 6,275,186 B1    8/2001  Kong
2002/0051431 A1 5/2002  Choi et al.
(Continued)

FOREIGN PATENT DOCUMENTS

CN     1969477       5/2007
JP     2004-535728   11/2004
(Continued)

OTHER PUBLICATIONS

3rd Generation Partnership Program (3GPP), "Digital cellular telecommunications system (Phase 2+); Universal Mobile Telecommunications System (UMTS); LTE; Network architecture (3GPP TS 23.002 version 9.3.0 Release 9)", ETSI TS 123 002 V9.3.0, Jun. 2010.

(Continued)

*Primary Examiner* — Ajit Patel
(74) *Attorney, Agent, or Firm* — Lee, Hong, Degerman, Kang & Waimey

(57) ABSTRACT

A method of determining a position in a wireless communication system and apparatus thereof are disclosed. The present invention includes receiving system information including information on a reference cell and at least one neighbor cell from a location server, receiving positioning reference signals (PRSs) from the reference cell and the at least one neighbor cell using the system information, measuring reference signal time difference (RSTD) of each of the at least one neighbor cell for the reference cell, and transmitting the at least one measured RSTD to the location server. And, the RSTD is a relative timing difference between two cells. Moreover, the system information includes at least one cell for obtaining a system frame number (SFN) by the UE, as the reference cell or the at least one neighbor cell.

20 Claims, 12 Drawing Sheets

(51) Int. Cl.
*G01S 5/10* (2006.01)
*H04W 24/10* (2009.01)
*H04W 48/16* (2009.01)
*H04W 64/00* (2009.01)

(56) References Cited

U.S. PATENT DOCUMENTS

| | | |
|---|---|---|
| 2011/0039577 A1* | 2/2011 | Stern-Berkowitz et al. .................. 455/456.1 |
| 2011/0149868 A1* | 6/2011 | Krishnamurthy et al. .... 370/328 |
| 2011/0312339 A1* | 12/2011 | Kuningas et al. .......... 455/456.1 |
| 2013/0040673 A1* | 2/2013 | Siomina et al. ............... 455/501 |
| 2013/0315168 A1* | 11/2013 | Frank et al. ................... 370/329 |
| 2014/0094188 A1* | 4/2014 | Kazmi et al. ............... 455/456.1 |

FOREIGN PATENT DOCUMENTS

| | | |
|---|---|---|
| JP | 2012-523183 | 9/2012 |
| KR | 1020000038962 | 7/2000 |
| KR | 1020020008073 | 1/2002 |
| KR | 10-2003-0003382 | 1/2003 |
| KR | 1020050119055 | 12/2005 |
| KR | 1020080035956 | 4/2008 |
| KR | 10-2008-0065247 | 7/2008 |
| WO | 2008/048059 | 4/2008 |
| WO | 2010/118305 | 10/2010 |
| WO | 2010/144765 | 12/2010 |

OTHER PUBLICATIONS

LG Electronics, "SFN unknown problem for PRS Muting Pattern in OTDOA," 3GPP TSG RAN WG2 #73, R2-111378, XP-050493822, Feb. 2011, 4 pages.

LG Electronics, "Clarification of SFN acquisition of reference/neighbor cells on OTDOA," 3GPP TSG RAN WG1 #62, R1-104752, XP-050450131, Aug. 2010, 4 pages.

LG Electronics, "SFN for PRS muting sequence," Change Request 36.355 CR, Current Version: 10.0.0, 3GPP TSG-RAN2 Meeting #73, R2-111380, XP-050493813, Feb. 2011, 3 pages.

LTE, Evolved Universal Terrestrial Radio Access (E-UTRA); LTE Positioning Protocol (LPP) (3GPP TS 36.355 version 9.2.1 Release 9), ETSI TS 136 355 V9.2.1, XP-014047473, Jul. 2010, 114 pages. (relevant pages: pp. 38-45).

European Patent Office Application Serial No. 11807012.7, Search Report dated Feb. 5, 2014, 9 pages.

The State Intellectual Property Office of the People's Republic of China Application Serial No. 201180034915.9, Office Action dated Dec. 2, 2014, 7 pages.

\* cited by examiner

FIG. 9

```
-- ASN1START

OTDOA-ProvideAssistanceData : : = SEQUENCE {
        otdoa - ReferenceCellInfo      OTDOA - ReferenceCellInfo    OPTIONAL,
        otdoa - NeighbourCellInfo      OTDOA - NeighbourCellInfo    OPTIONAL,
        otdoa - Error                  OTDOA - Error                OPTIONAL,
        ...
}
-- ASN1STOP
```

FIG. 10

```
-- ASN1START

OTDOA-ReferenceCellInfo ::= SEQUENCE {
    prs-Bandwidth           INTEGER (0..503),
    cellGlobalId            ECGI                                              OPTIONAL,   -- Need ON
    earfcnRef               ARFCN-ValueEUTRA                                  OPTIONAL,   -- Cond NotSameAsServ0
    antennaPortConfig       ENUMERATED {ports1-or-2, ports4,...}
                                                                              OPTIONAL,   -- Cond NotSameAsServ1
    cpLength                ENUMERATED {normal, extended,...},
    prsInfo                 PRS-Info                                          OPTIONAL,   -- Cond PRS
    ...
}

-- ASN1STOP
```

FIG. 11

```
-- ASN1START

PRS-Info ::= SEQUENCE {
    prs-Bandwidth              ENUMERATED { n6, n15, n25, n50, n75, n100, ...},
    prs-ConfigurationIndex     INTEGER (0..4095),
    numDL-Frames               ENUMERATED { sf-1, sf-2, sf-4, sf-6, ...},
    ...,
    prs-MutingInfo-r9          CHOICE {
        po2-r9                     BIT STRING  (SIZE (2)),
        po4-r9                     BIT STRING  (SIZE (4)),
        po8-r9                     BIT STRING  (SIZE (8)),
        po16-r9                    BIT STRING  (SIZE (16)),
        ...
    }                                                            OPTIONAL    -- Need OP
}

-- ASN1STOP
```

FIG. 12

```
-- ASN1START

OTDOA-NeighbourCellInfoList ::= SEQUENCE (SIZE (1..maxFreqLayers)) OF OTDOA-NeighbourFreqInfo
OTDOA-NeighbourCellInfo ::= SEQUENCE (SIZE (1..24)) OF OTDOA-NeighbourCellInfoElement OTDOA-NeighbourCellInfoElemnet ::= SEZUENCE {
    physCellId                  INTEGER (0..503),
    cellGloballd                ECGI                        OPTIONAL,           -- Need ON
    earfcn                      ARFCN-ValueEUTRA            OPTIONAL,           -- Cond NotSameAsRef0
    cpLength                    ENUMERATED {normal, extended, ...}
                                                            OPTIONAL,
    prs Info                    prs Info                    OPTIONAL,           -- Cond NotsameAsref1
    antennaPortConfig           ENUMERATED { ports-1-or-2, ports-4, ...}
                                                            OPTIONAL,           -- Cond NotsameAsref2
    slotNumberOffset            INTEGER (0..31)             OPTIONAL,           -- Cond NotsameAsref3
    prs-subframeOffset          INTEGER (0..1279)           OPTIONAL,           -- Cond NotsameAsref4
    expectedRSTD                INTEGER (0..16383),                             -- Cond InterFreq
    expectedRSTD-Uncertainty    INTEGER (0..1023),
    ...
} maxFreqLayers   INTEGER ::= 3

-- ASN1STOP
```

METHOD OF DETERMINING A POSITION IN A WIRELESS COMMUNICATION SYSTEM AND APPARATUS THEREOF

CROSS-REFERENCE TO RELATED APPLICATIONS

Pursuant to 35 U.S.C. §119, this application claims the benefit of earlier filing date and right of priority to Korean Patent Application No. 10-2011-0026815, filed on Mar. 25, 2011 and U.S. Provisional Application No. 61/364,818 filed on Jul. 16, 2010, the contents of which are hereby incorporated by reference herein in their entirety.

BACKGROUND OF THE INVENTION

1. Field of the Invention

The present invention relates to a wireless communication system, and more particularly, to a method of determining a position in a wireless communication system and apparatus thereof.

2. Discussion of the Related Art

First of all, a frame structure in a wireless communication system is described with reference to FIG. 1 as follows.

FIG. 1 is a diagram for a frame structure of LTE (long term evolution) system.

Referring to FIG. 1, a single frame is constructed with 10 subframes. Each of the subframes includes a pair of slots. A time taken to transmit one subframe is called a transmission time interval (hereinafter abbreviated TTI). For instance, a single subframe amounts to 1 ms and a single slot amounts to 0.5 ms.

One slot includes a plurality of OFDM (orthogonal frequency division multiplexing) symbols. In this case, the OFDM symbol can be called SC-FDMA symbol or symbol duration.

One slot includes 7 or 6 OFDM symbols in accordance with a length of a cyclic prefix (hereinafter abbreviated CP). In LTE system, cyclic prefixes can be classified into a normal CP and an extended CP. In case of using a normal CP, a single slot includes 7 OFDM symbols. In case of using an extended CP, a single slot includes 6 OFDM symbols. And, the extended CP is used in case that a delay spread is big.

FIG. 2 is a diagram of a slot structure in LTE.

Referring to FIG. 2, a signal transmitted in each slot can be depicted using a resource grid constructed with $N^{DL}_{RB} \times N^{DL}_{SC}$ subcarriers and $N^{DL}_{symb}$ OFDM (Orthogonal Frequency Division Multiplexing) symbols. In this case, the $N^{DL}_{RB}$ indicates the number of resource blocks (RBs), the $N^{DL}_{SC}$ indicates the number of subcarriers configuring a single RB, and the $N^{DL}_{symb}$ indicates the number of OFDM symbols in a single slot.

In the following description, a method of determining a position of a User Equipment according to a related art is explained.

First of all, the demand for a positioning method of a User Equipment is rising due to various applications in a real life. The positioning method of the user equipment can be mainly classified into a global positioning system (GPS) based scheme and a terrestrial positioning based scheme.

The GPS based scheme measures a position of a user equipment using satellites. Yet, the GPS based scheme requires reception signals from at least four satellites and is not applicable to an indoor environment.

The terrestrial positioning based scheme measures a position of a user equipment using a timing difference between signals from base stations and requires reception signals from at least three base stations. Although position estimating performance of the terrestrial positioning based scheme is inferior to that of the GPS based scheme, the terrestrial positioning based scheme is applicable to almost every environment. The terrestrial positioning based scheme estimates a position of a User Equipment using a synchronization signal or a reference signal. And, the terrestrial positioning based scheme can be defined as a following terminology per standard.

First of all, the terrestrial positioning based scheme is defined as OTDOA (Observed Time Difference of Arrival) in UTRAN (UMTS Terrestrial Radio Access Network). Secondly, the terrestrial positioning based scheme is defined as E-OTD (Enhanced Observed Time Difference) in GERAN (GSM/EDGE Radio Access Network). Thirdly, the terrestrial positioning based scheme is defined as AFLT (Advanced Forward Link Trilateration) in CDMA 2000.

FIG. 3 is a diagram for one example of downlink OTDOA as a sort of a terrestrial positioning based scheme used by 3GPP standards.

Referring to FIG. 3, since a User Equipment performs a reference clock with reference to a subframe transmitted from a current serving cell, signals received from neighbor cells differ from each other in TDOA (Time Difference Of Arrival).

FIG. 4 is a diagram for one example of a positioning method of a User Equipment (hereinafter abbreviated UE) using OTDOA.

Referring to FIG. 4, a method of determining a position of a UE is generally performed using a common reference signal (CRS) or a synchronization signal (e.g. primary synchronization signal/secondary synchronization signal: PSS/SSS). Alternatively, the method of determining a position of the UE can define and use a positioning reference signal (hereinafter abbreviated PRS) dedicated to LCS (location service). A user equipment finds a difference between a time taken to receive a signal from a single reference base station and a time taken to receive a signal from each of a plurality of neighboring base stations using reference or synchronization signals received from the single reference base station and a plurality of the neighboring base stations and then transmits the found time difference to an enhanced-serving mobile location center (E-SMLC). Subsequently, the E-SMLC is able to calculate a position of the UE by solving a linear equation using Taylor Series Expansion.

A location center (e.g. E-SMLC) is able to make a request for OTDOA information, which is required for calculating a position of a UE, to the base station. FIG. 5 is a diagram for exchanging OTDOA information between a location center and a base station.

Referring to FIG. 5, a location center transmits an OTDOA information request message to a base station. Having received the OTDOA information request message, the base station transmits an OTDOA information response message including OTDOA cell information to the location center. In this case, the OTDOA cell information contains a PRS configuration index of the base station, an SFN initialization time, a PRS muting configuration and the like.

Subsequently, the UE receives OTDOA information of a reference base station and OTDOA information of a plurality of neighboring base stations from the serving base station. In this case, the OTDOA information contains a PRS configuration index, a PRS muting configuration and the like.

In particular, the PRS configuration index indicates the information on a timing point of transmitting a PRS (positioning reference signal). Namely, the UE can acquire number of frame and number of slot, in which the base station transmits the PRS, from the PRS configuration index.

The UE is synchronized with a serving base station and is aware of a system frame number (hereinafter abbreviated SFN) of the serving base station only.

Yet, since the PRS configuration index is configured to match an SFN of the reference or neighboring base station that transmits the PRS, the UE should be aware of the SFN of the reference or neighboring base station.

In case of a synchronous network having transmission synchronization matched between base stations or a partially aligned synchronous network, since the UE is able to estimate an SFN boundary of the reference base station or neighboring base station with reference to the serving cell, it does not cause a serious problem. On the contrary, in case of an asynchronous network having transmission synchronization mismatched between base stations, the UE is able to receive the PRS from the reference base station or the neighboring base station only if aware of the SFN information of the reference or neighboring base station.

In case that the UE is not aware of the SFN information of a signal received from the reference or neighboring base station, the UE should obtain the SFN information by decoding P-BCH (primary-broadcast channel) of each of the corresponding base stations, which increases complexity of the UE. And, it causes a problem that P-BCH received from a base station having a low SINR of a reception signal has a low successful decoding rate.

Generally, since a reference cell is a cell to become a reference of TDOA, it is highly probable that a cell having good geometry will be set as a reference cell. Hence, a successful decoding rate of P-BCH can be high. Yet, the successful decoding rates of P-BCH of neighbor cells may be low. For instance, since Es/Iot reference of a reference cell for OTDOA and Es/Iot reference of a neighbor cell for OTDOA in the definition by TS 36.133 are −6 dB and −13 dB, respectively, it is difficult for a UE to successfully decode P-BCH of the neighbor cell.

In particular, according to a related art, since a UE is synchronized with a serving base station, it causes a problem that efficiency in receiving PRS from a reference cell or a neighbor cell is lowered.

According to a related art, in which PRS muting information is defined with reference to SFN of a serving cell, a position on a subframe of muting is calculated with reference to the SFN of the serving cell. Hence, a PRS configuration index is configured to match SFN of a reference or neighbor cell that transmits PRS and the PRS muting information is defined with reference to the SFN of the serving cell, which causes a problem that the PRS configuration index and the PRS muting information conflict with each other.

According to a related art, in which PRS muting information is defined with reference to SFN of a reference cell, a position on a subframe of muting is calculated with reference to the SFN of the reference cell. Hence, a PRS configuration index is configured to match SFN of a reference or neighbor cell that transmits PRS and the PRS muting information is defined with reference to the SFN of the reference cell, which causes a problem that the PRS configuration index and the PRS muting information conflict with each other.

As mentioned in the foregoing description, according to the related arts, efficiency in receiving PRS from a reference or neighbor cell is lowered.

SUMMARY OF THE INVENTION

Accordingly, the present invention is directed to a method of determining a position in a wireless communication system and apparatus thereof that substantially obviate one or more problems due to limitations and disadvantages of the related art.

An object of the present invention is to provide a method of determining a position in a wireless communication system and apparatus thereof, which enables a UE to efficiently receive PRS from a reference or neighbor cell.

Additional advantages, objects, and features of the invention will be set forth in part in the description which follows and in part will become apparent to those having ordinary skill in the art upon examination of the following or may be learned from practice of the invention. The objectives and other advantages of the invention may be realized and attained by the structure particularly pointed out in the written description and claims hereof as well as the appended drawings.

To achieve these objects and other advantages and in accordance with the purpose of the invention, as embodied and broadly described herein, a method of determining a position of a User Equipment in a wireless communication system according to the present invention includes the steps of receiving system information including information on a reference cell and at least one neighbor cell from a location server, receiving positioning reference signals (PRSs) from the reference cell and the at least one neighbor cell using the system information, measuring reference signal time difference (RSTD) of each of the at least one neighbor cell for the reference cell, and transmitting the at least one measured RSTD to the location server.

And, the RSTD is a relative timing difference between two cells. Moreover, the system information includes at least one cell for obtaining a system frame number (SFN) by the UE, as the reference cell or the at least one neighbor cell.

Preferably, the at least one cell for obtaining the SFN, is a serving cell.

Preferably, the system information includes a slot number offset, an RSTD expected value and uncertainty of the RSTD expected value of the at least one neighbor cell, the slot number offset is an offset between a slot number of the reference cell and a slot number of each of the at least one neighbor cell, the RSTD expected value is an RSTD value expected to be measured by the UE, and the uncertainty of the RSTD expected value is an error range of the RSTD expected value.

Preferably, the system information includes a PRS configuration index indicating information on a timing point of transmitting the PRS of the reference cell and a PRS configuration index indicating information on a timing point of transmitting the PRS of each of the at least one neighbor cell.

Preferably, the method further includes the step of transmitting a message for requesting the system information to the location server.

Preferably, the step of measuring the RSTD includes the steps of measuring a time of arrival (TOA) of the PRS of the reference cell using the system information, measuring a TOA of the PRS of each of the at least one neighbor cell using the system information, and calculating the RSTD of each of the at least one neighbor cell for the reference cell using the measured TOA of the reference cell and the measured TOA of each of the at least one neighbor cell.

More preferably, if the at least one cell is the reference cell, the step of measuring the TOA of the reference cell includes the step of receiving the PRS of the reference cell using the SFN of the reference cell and a PRS configuration index of the reference cell included in the system information, and the PRS configuration index of the reference cell indicates a timing point on which the PRS of the reference cell is transmitted.

More preferably, if the at least one cell is the at least one neighbor cell, the step of measuring the TOA of the reference cell includes the step of receiving the PRS of the reference cell using a slot number offset of the at least one cell, an RSTD expected value and uncertainty of the RSTD expected value in the system information. The slot number offset is an offset between a slot number of the reference cell and a slot number of the at least one cell. The RSTD expected value is an RSTD value expected to be measured by the UE. And, the uncertainty of the RSTD expected value is an error range of the RSTD expected value.

In another aspect of the present invention, a method of supporting a positioning of a User Equipment (UE) by a location server of a wireless communication system includes the steps of transmitting system information including information on a reference cell and at least one neighbor cell to the UE and receiving reference signal time difference (RSTD) of each of the at least one neighbor cell for the reference cell from the UE. The RSTD is measured by the UE according to positioning reference signals (PRSs) received from the reference cell and the at least one neighbor cell using the system information. And, the RSTD is a relative timing difference between two cells. Moreover, the system information includes at least one cell for obtaining a system frame number (SFN) by the UE, as the reference cell or the at least one neighbor cell.

In another aspect of the present invention, a User Equipment (UE) in a wireless communication system includes a receiving module configured to receive system information including information on a reference cell and at least one neighbor cell from a location server, a processor configured to measure reference signal time difference (RSTD) of each of the at least one neighbor cell for the reference cell by receiving positioning reference signals (PRSs) from the reference cell and the at least one neighbor cell using the system information, and a transmitting module configured to transmit the RSTD to the location server. And, the RSTD is a relative timing difference between two cells. Moreover, the system information includes at least one cell for obtaining a system frame number (SFN), as the reference cell or the at least one neighbor cell.

In a further aspect of the present invention, a location server in a wireless communication system includes a transmitting module configured to transmit system information including information on a reference cell and at least one neighbor cell to a UE and a receiving module configured to receive reference signal time difference (RSTD) of each of the at least one neighbor cell for the reference cell from the UE. The RSTD is measured by the UE according to positioning reference signals (PRSs) received from the reference cell and the at least one neighbor cell using the system information. And, the RSTD is a relative timing difference between two cells. Moreover, the system information includes at least one cell for obtaining a system frame number (SFN) by the UE, as the reference cell or the at least one neighbor cell.

According to embodiments of the present invention, at least one cell enabling a UE to obtain a system frame number (hereinafter abbreviated SFN) is included as a reference cell or a neighbor cell in system information for OTDOA, whereby a UE is able to efficiently receive PRS from the reference cell or the neighbor cell.

It is to be understood that both the foregoing general description and the following detailed description of the present invention are exemplary and explanatory and are intended to provide further explanation of the invention as claimed.

BRIEF DESCRIPTION OF THE DRAWINGS

The accompanying drawings, which are included to provide a further understanding of the invention and are incorporated in and constitute a part of this application, illustrate embodiment(s) of the invention and together with the description serve to explain the principle of the invention. In the drawings:

FIG. 9 is a diagram of OTDOA assistance data included in an assistance data providing message;

FIG. 10 is a diagram of OTDOA reference cell information;

FIG. 11, is a diagram of prsInfo;

FIG. 12 is a diagram of an OTDOA neighbor cell information list;

DETAILED DESCRIPTION OF THE INVENTION

Reference will now be made in detail to the preferred embodiments of the present invention, examples of which are illustrated in the accompanying drawings. In the following detailed description of the invention includes details to help the full understanding of the present invention. Yet, it is apparent to those skilled in the art that the present invention can be implemented without these details. For instance, although the following descriptions are made in detail on the assumption that a mobile communication system includes UMTS system, the following descriptions are applicable to other random mobile communication systems except unique features of the UMTS system.

Occasionally, to prevent the present invention from getting vaguer, structures and/or devices known to the public are skipped or can be represented as block diagrams centering on the core functions of the structures and/or devices. Wherever possible, the same reference numbers will be used throughout the drawings to refer to the same or like parts.

Besides, in the following description, assume that a terminal is a common name of such a mobile or fixed user side device as a user equipment (UE), a mobile station (MS), an advanced mobile station (AMS) and the like. And, assume that a base station is a common name of such a random node of a network side communicating with a terminal as a Node B (NB), an eNode B (eNB), a base station (BS), an advanced base station (ABS) and the like.

In the following description, a positioning reference signal (hereinafter abbreviated PRS) is explained.

First of all, PRS is a reference signal used for positioning of a UE and is carried on resource blocks of a downlink (hereinafter abbreviated DL) subframe determined for PRS transmission only.

PRS sequence is defined according to Formula 1.

$$r_{l,n_s}(m) = \frac{1}{\sqrt{2}}(1 - 2 \cdot c(2m)) + j\frac{1}{\sqrt{2}}(1 - 2 \cdot c(2m+1)),$$
$$m = 0, 1, \ldots, 2N_{RB}^{max,DL} - 1$$

[Formula 1]

In Formula 1, the $r_{l,n_s}(m)$ indicates a PRS sequence, the $n_s$ indicates a slot number in a frame, and the '1' indicates an OFDM symbol number in a slot. The c(i) indicates pseudo-random sequence, and a pseudo-random sequence generator is initialized in to $c_{init}$ shown in Formula 2 at a start point of each OFDM symbol.

$$c_{init} = 2^{10} \cdot (7 \cdot (n_s+1) + l + 1) \cdot (2 \cdot N_{ID}^{cell} + 1) + 2 \cdot N_{ID}^{cell} + N_{CP}$$ [Formula 2]

In Formula 2, the $N_{ID}^{cell}$ is a physical layer cell ID. The $N_{CP}$ is set to 1 if an OFDM symbol has a normal cyclic prefix (CP). The $N_{CP}$ is set to 0 if an OFDM symbol has an extended cyclic prefix (CP).

Figure 1:
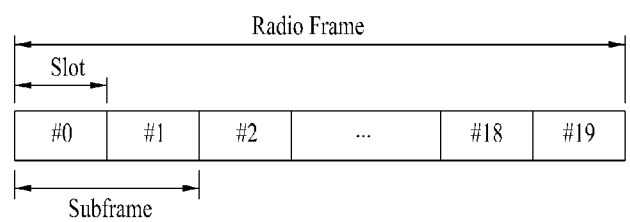
FIG. 1 is a diagram for a frame structure of LTE (long term evolution) system.
Figure 2:
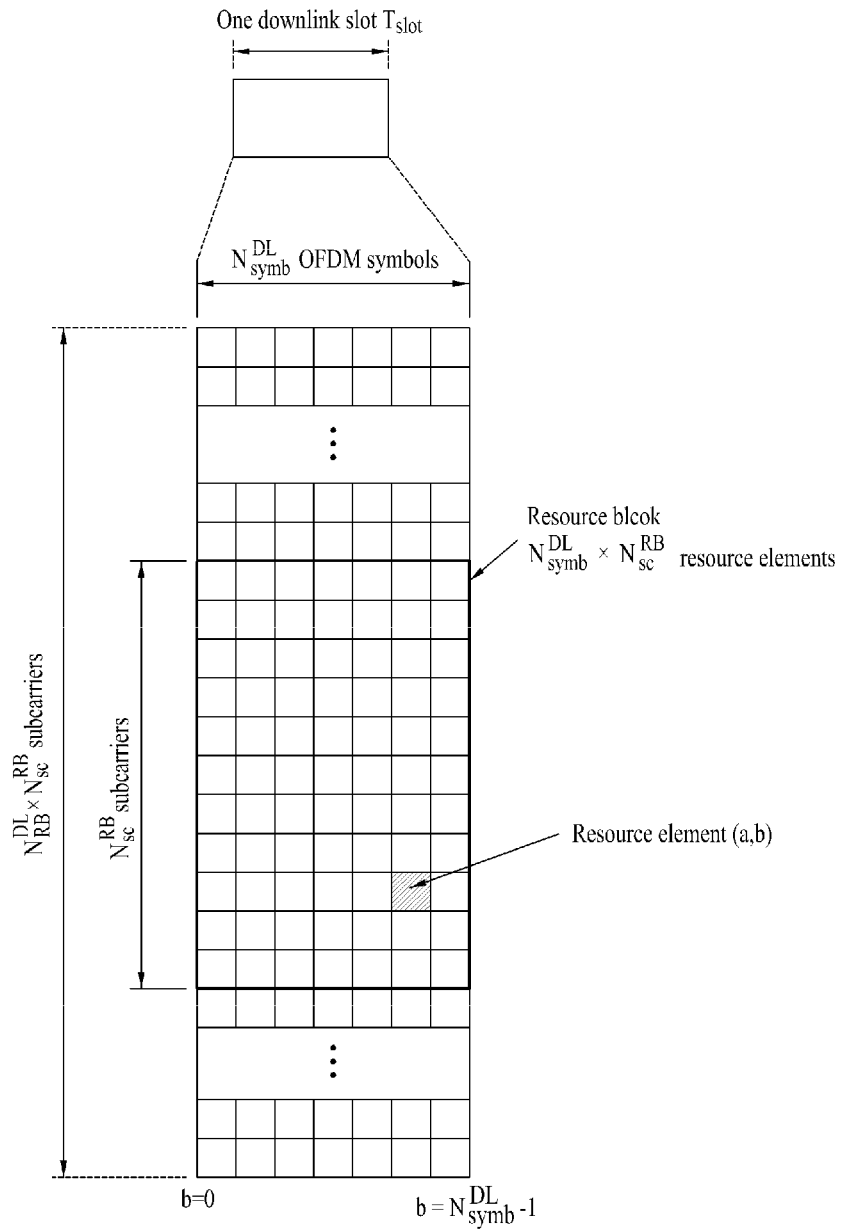
FIG. 2 is a diagram of a slot structure in LTE.
Figure 3:
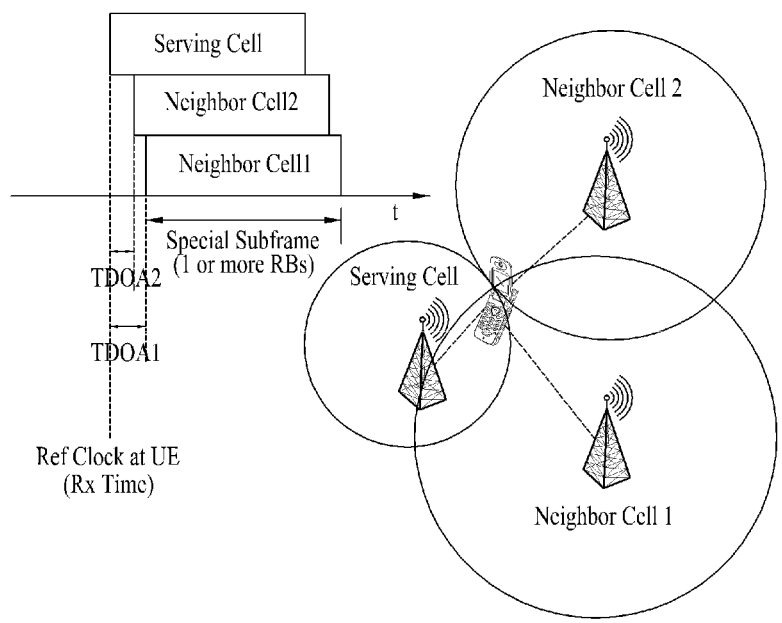
FIG. 3 is a diagram for one example of downlink OTDOA as a sort of a terrestrial positioning based scheme used by 3GPP standards.
Figure 4:
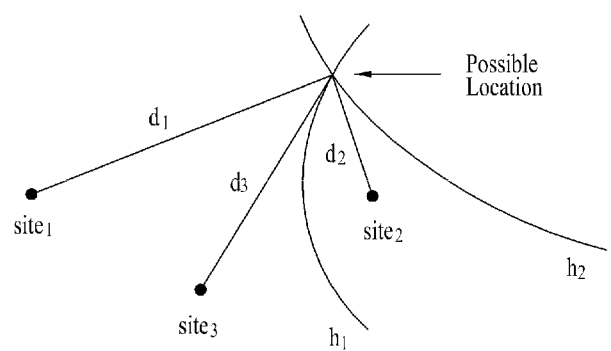
FIG. 4 is a diagram for one example of a positioning method of a UE using OTDOA.
Figure 5:
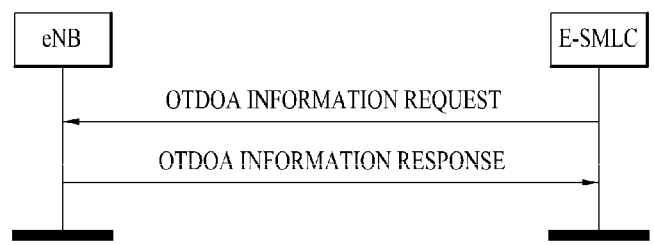
FIG. 5 is a diagram for exchanging OTDOA information between a location center and a base station.
Figure 6:
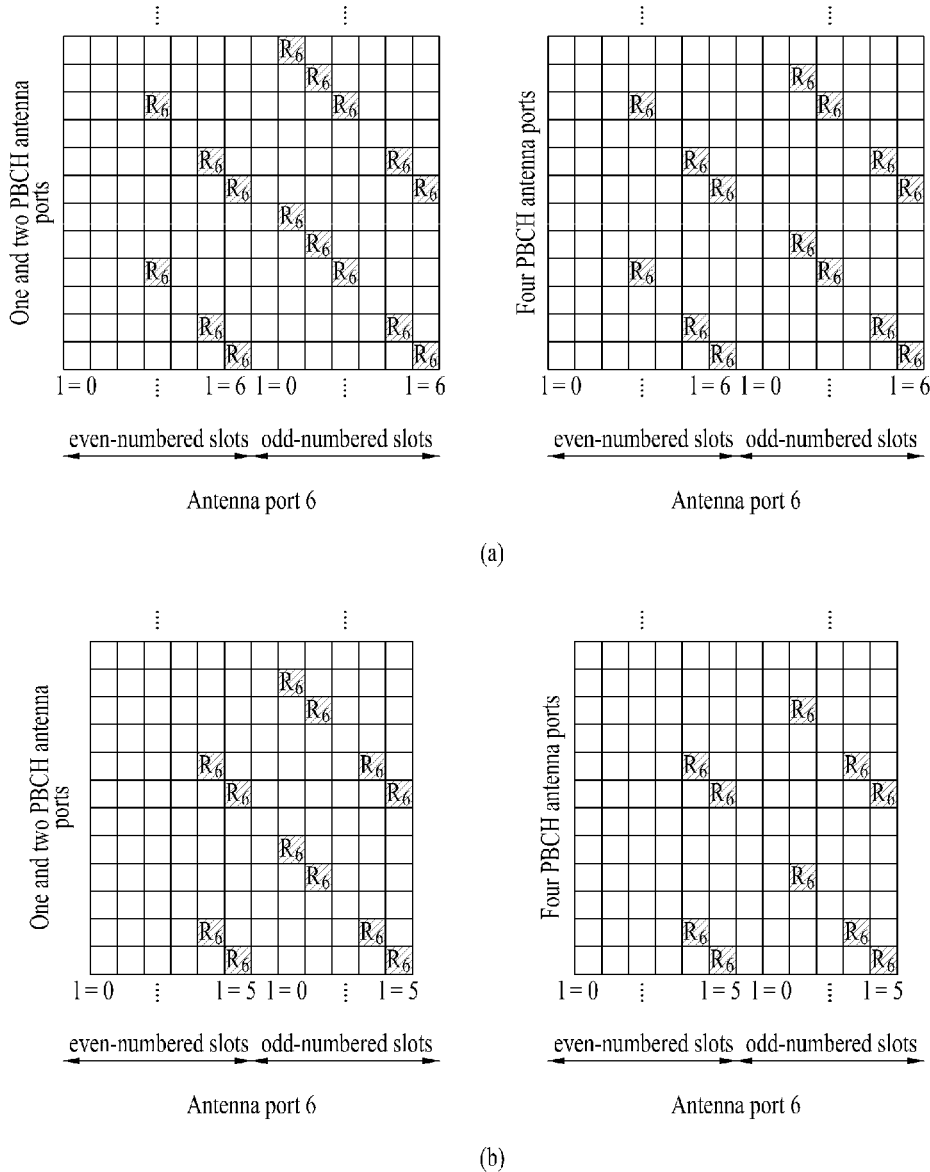
FIG. 6 is a diagram of patterns of PRS allocated to a resource element.

FIG. 6 is a diagram of patterns of PRS allocated to a resource element. FIG. 6(a) shows a case of normal CP. FIG. 6(b) shows a case of extended CP.

In the following description, a method of determining a position of a UE according to an embodiment of the present invention is explained with reference to the accompanying drawings.

First of all, in a method of determining a position of a UE according to an embodiment of the present invention, the UE calculates a reference signal time difference (hereinafter named RSTD) between a reference cell and neighbor cells by receiving assistance data from a base station and also receiving PRS from the reference cell and the neighbor cells using the received assistance data and then transmits the calculated RSTD to a serving base station. Subsequently, the serving base station transmits the RSTD to a location server. Finally, the location server determines a position of the UE using the RSTD.

The RSTD means a relative timing difference between the reference cell and the neighbor cell and can be defined as Formula 3.

$$T_{SubframeRxj} - T_{SubframeRxi}$$ [Formula 3]

In Formula 3, the $T_{SubframeRxj}$ is a time at which a UE starts to receive a start point of one subframe from a neighbor cell j, and the $T_{subframeRxi}$ is a time at which the UE starts to receive a start point of a subframe nearest to the former subframe, which was received from the cell j, from a reference cell i. Moreover, a reference point of subframe timing difference can becomes an antenna connector of the UE.

Preferably, the reference cell and the neighbor cell can transmit the PRS at timing points similar to each other, respectively. If the reference cell and the neighbor cells transmit the PRS at the similar timing point, a difference between a timing point, at which the UE receives the PRS from the reference cell, and a timing point, at which the UE receives the PRS from each of a plurality of the neighbor cells, lies within a predetermined time range. For instance, the difference between the timing point, at which the UE receives the PRS from the reference cell, and the timing point, at which the UE receives the PRS from each of a plurality of the neighbor cells, can lie within 1 subframe. If so, assuming that a prescribed subframe received by the UE from the neighbor cell j is a first subframe of PRS positioning occasions of the neighbor cell j according to the definition of the RSTD, a prescribed subframe received from the cell i nearest to the prescribed subframe received from the cell j becomes the first subframe of the PRS positioning occasions of the reference cell i. In this case, the PRS positioning occasions mean consecutive DL subframes to which PRS is allocated. Therefore, the RSTD becomes a difference between a timing point of receiving the PRS from the neighbor cell j and a timing point of receiving the PRS from the reference cell i. In this case, a timing point of receiving a PRS from a specific cell is called TOA (time of arrival) of the PRS.

A method of determining a position of a UE according to a first embodiment of the present invention is described with reference to FIG. 7 as follows.

Figure 7:
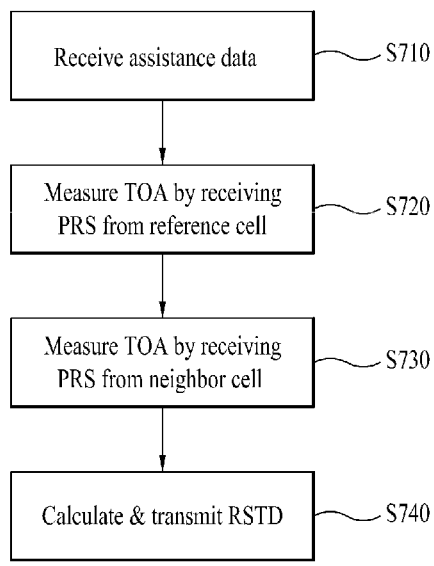
FIG. 7 is a flowchart for a method of determining a position of a UE according to a first embodiment of the present invention.

FIG. 7 is a flowchart for a method of determining a position of a UE according to a first embodiment of the present invention.

Referring to FIG. 7, a UE receives assistance data from a location server [S710]. In this case, the assistance data includes system information of a reference cell and a plurality of neighbor cells to enable the UE to calculate RSTD.

Figure 8:
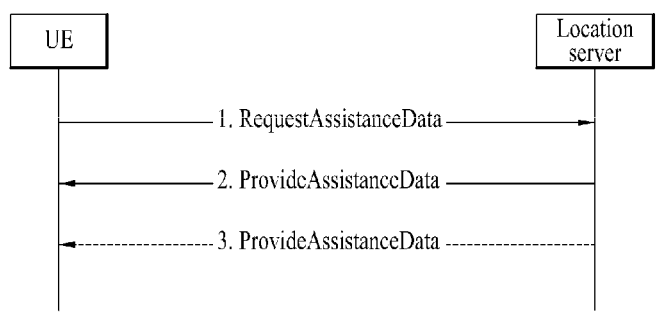
FIG. 8 is a diagram of a process for a UE to request assistance data to the location server and receive assistance data from a location server.

The UE makes a request for the assistance data to the location server and is then able to receive the assistance data from the location server, via a base station. FIG. 8 is a diagram of a process for the UE to request the assistance data to the location server and receive the assistance data from the location server. Referring to FIG. 8, the UE transmits an assistance data request message (RequestAssistanceData) to the location server via the base station. Subsequently, the location server transmits an assistance data providing message (ProvideAssistanceData) including the assistance data to the UE. The location server is also able to transmit an additional assistance data providing message including additional assistance data to the UE. In particular, the assistance data providing message last sent by the location server includes an end transaction indicator indicating that the corresponding assistance data providing message is a last message.

Alternatively, the location server is able to transmit an assistance data providing message without a request made by the UE.

FIG. 9 is a diagram of OTDOA assistance data included in an assistance data providing message (ProvideAssitanceData).

Referring to FIG. 9, OTDOA assistance data includes OTDOA reference cell information (otdoa-ReferenceCellInfo) and OTDOA neighbor cell information (otdoa-NeighbourCellInfo) list.

FIG. 10 is a diagram of OTDOA reference cell information. In this case, the OTDOA reference cell information includes information on a reference cell.

Referring to FIG. 10, the OTDOA reference cell information includes a physical cell identity (physCellId), an antenna port configuration (antennaPortConfig), a cyclic prefix length (cpLength) and PRS information (prsInfo).

The phyCellId indicates a physical cell ID of a reference cell. The antennaPortConfig indicates whether a reference cell uses 1 antenna port (or 2 antenna ports) or 4 antenna ports for a cell-specific reference signal. The cpLength indicates a length of a cyclic prefix of PRS of a reference cell. And, the psrInfo indicates information on PRS configuration of a reference cell.

FIG. 11 is a diagram of the prsInfo.

Referring to FIG. 11, the prsInfo includes a PRS bandwidth (prs-Bandwidth), a PRS configuration index (prs-ConfigurationIndex), a number of DL frames (numDL-Frames) and PRS muting information (prs-MutingInfo).

The prs-Bandwidth indicates a bandwidth used in configuring the PRS. And, the numDL-Frames indicates the number $N_{prs}$ of contiguous DL subframes to which the PRS is allocated.

The prs-MutingInfo indicates a PRS muting configuration of a corresponding cell. The PRS muting configuration is defined by a periodic PRS muting sequence having a periodicity of $T_{PRS}$. And the $T_{PRS}$ is represented as the number of PRS positioning occasions. In this case, the positioning occasions include $N_{prs}$ DL subframes. The PRS muting information can be defined with reference to SFN of a serving cell or a reference cell. In case that the PRS muting information is defined with reference to the SFN of the serving cell, a first bit of a PRS muting sequence corresponds to a first positioning occasion starting after a start point of a frame having a system frame number (SFN) of the serving cell set to 0. In case that the PRS muting information is defined with reference to the SFN of the reference cell, a first bit of a PRS muting sequence corresponds to a first positioning occasion starting after a start point of a frame having a system frame number (SFN) of the reference cell set to 0.

The prs-ConfigurationIndex indicates a PRS configuration index. In this case, the PRS configuration index ($I_{PRS}$) indicates information on a timing point of transmitting the PRS. Table 1 shows PRS transmission periodicity ($T_{PRS}$) and PRS subframe offset ($\Delta_{PRS}$) according to a PRS configuration index.

TABLE 1

| PRS configuration Index ($I_{PRS}$) | PRS periodicity $T_{PRS}$ (subframes) | PRS subframe offset $\Delta_{PRS}$ (subframes) |
| --- | --- | --- |
| 0-159 | 160 | $I_{PRS}$ |
| 160-479 | 320 | $I_{PRS}$ - 160 |
| 480-1119 | 640 | $I_{PRS}$ - 480 |
| 1120-2399 | 1280 | $I_{PRS}$ - 1120 |
| 2400-4095 | | Reserved |

The PRS configuration index is configured in a higher layer. The PRS is transmitted on a configured subframe only and is transmitted on $N_{PRS}$ contiguous DL subframes. The $N_{PRS}$ is configured in the higher layer as well. A first one of the $N_{PRS}$ contiguous subframes, on which the PRS is transmitted, is the subframe that meets Formula 4.

$$(10 \times n_f + \lfloor n_s/2 \rfloor - \Delta_{PRS}) \bmod T_{PRS} = 0. \quad \text{[Formula 4]}$$

In Formula 4, the $n_f$ indicates an SFN and the $n_s$ indicates a slot number. In particular, if a UE receives an assistance data providing message, it can be aware of a frame and a slot on which a PRS is transmitted, using a PRS configuration index of a reference cell contained in the assistance data providing message. Yet, since the PRS configuration index is configured with reference to an SFN of a cell that transmits the PRS, the HE needs to be aware of the SFN of the cell transmitting the PRS in order to obtain a transmission timing point of the PRS.

FIG. 12 is a diagram of an OTDOA neighbor cell information list.

Referring to FIG. 12, an OTDOA neighbor cell information list includes a plurality of ODOA neighbor cell information elements (OTDOA-NeighbourCellInfoElement). In this case, a plurality of the OTDOA neighbor cell information elements contained in the OTDOA neighbor cell information list can be sorted in a descending order in accordance with a priority of a neighbor cell for the RSTD measurement of the UE. In particular, a first OTDOA neighbor cell information element contained in the OTDOA neighbor cell information list can be the OTDOA neighbor cell information element of the neighbor cell having the highest priority for the RSTD measurement of the UE.

Each of the OTDOA neighbor cell information elements includes a physical cell identity (physCellId), a cyclic prefix length (cpLength), PRS information (prsInfo), an antenna port configuration (antennaPortConfig), a slot number offset (slotNumberOffset), a PRS subframe offset (prs-SubframeOffset), an RSTD expected value (expectedRSTD) and an uncertainty of an RSTD expected value (expectedRSTD-Uncertainty).

The physCellId indicates a physical cell ID of a neighbor cell. The antennaPortConfig indicates whether the neighbor cell uses one (or two) antenna ports or four antenna ports for a cell-specific reference signal. And, the cpLength indicates a length of a cyclic prefix of the neighbor cell.

The prsInfo indicates a PRS configuration of a neighbor cell. The prsInfo included in an OTDOA neighbor cell information element has the same form of the prsInfor contained in the OTDOA reference cell information shown in FIG. 11. In particular, the prsInfo includes prs-Bandwidth, prs-ConfigurationIndex, numDL-Frames and prs-MutingInfo.

In particular, the prs-Bandwidth indicates a bandwidth used in configuring a PRS of the neighbor cell, the numDL-Frames indicates the number $N_{prs}$ of contiguous DL subframes having the PRS of the neighbor cell allocated thereto, the prs-MutingInfo indicates a PRS muting configuration of the neighbor cell, and the prs-ConfigurationIndex indicates a PRS configuration index of the neighbor cell.

The slotNumberOffset indicates a slot number offset between a reference cell and a neighbor cell. In this case, the slot number offset means an offset ranging from a start point of a specific radio frame of the reference cell to a start point of a radio frame of the neighbor cell coming first next to the specific radio frame. The slot number offset is represented as the number of slots. If a timing of the neighbor cell is equal to that of the reference cell, it is able to omit a field slotNumberOffset.

The prs-SubframeOffset is an offset between a first PRS subframe of a reference cell on a reference carrier frequency and a first PRS subframe of a PRS burst of a neighboring cell coming first next to the first PRS subframe on a different carrier frequency and is represented as the number of subframes.

The expectedRSTD indicates an RSTD value expected to be measured by a UE. If $T_s$ is 1/(15000*2048) second, a resolution of the expectedRSTD is $3T_s$.

The expectedRSTD-Uncertainty shows uncertainty of a value of the expectedRSTD. In particular, the expectedRSTD-Uncertainty indicates an error range of the expectedRSTD value. The uncertainty of the expectedRSTD value is associated with a UE location estimation of the location server. The expectedRSTD-Uncertainty defines such a search window of UE as shown in Formula 5. And, a resolution of the expectedRSTD-Uncertainty is $3T_s$ as well.

[expectedRSTD−expectedRSTD−Uncertainty]<measured RSTD<[expectedRSTD+expectedRSTD−Uncertainty]     [Formula 5]

As mentioned in the foregoing description, if a UE receives an assistance data providing message, the UE can be aware of frames and slots on which PRSs of reference and neighbor cells are transmitted, using PRS configuration indexes (contained in the assistance data providing message) of the reference and neighbor cells. Yet, since the PRS configuration index of the reference cell is configured with reference to an SFN of the reference cell, the UE should be aware of the SFN of the reference cell in order to acquire the frame and slot on which the PRS of the reference cell is transmitted. Likewise, since the PRS configuration index of the neighbor cell is configured with reference to an SFN of the neighbor cell, the UE should be aware of the SFN of the neighbor cell in order to acquire the frame and slot on which the PRS of the neighbor cell is transmitted.

If the UE is aware of the SFN of one of the reference and neighbor cells, the UE is able to calculate a frame and a slot on which the PRS of the corresponding cell, of which SFN is known, is transmitted. For the cells of which SFNS are unknown, the UE is able to receive a PRS using expectedRSTD, expectedRSTD-Uncertainty and the frame and slot on which the PRS of the cell, of which SFN is known, is transmitted. A process for the UE to receive the PRS using expectedRSTD, expectedRSTD-Uncertainty and the frame and slot on which the PRS of the cell, of which SFN is known, is transmitted, shall be explained in detail in the descriptions of the step S720 and the step S730.

Therefore, according to the first embodiment of the present invention, it is proposed that a location server enables a cell, of which SFN can be acquired by a UE, to be contained as a reference or neighbor cell in assistance data. Yet, since the UE is generally synchronized with a serving cell and is just aware of an SFN of the serving cell, the location server can enable the serving cell to be contained as a reference or neighbor cell in the assistance data. For example, an embodiment of the present invention relates to a case that a serving cell is contained as a reference cell or a neighbor cell in assistance data, by which the present invention is non-limited. And, the present invention is applicable to all cases that a cell enabling its SFN to be acquired by a UE is contained as a reference cell or a neighbor cell in assistance data.

Referring now to FIG. 7, the UE receives the PRS from the reference cell and then measures a TOA of the received PRS of the reference cell [S720].

In particular, in case that a serving cell is a reference cell, a method for a UE to measure a TOA of a PRS of the reference cell is described as follows.

First of all, in order to receive a PRS, a UE should be aware of a PRS sequence. In order to find a PRS sequence of a reference cell using Formula 1, the user UE should be aware of a slot number of the reference cell. In case that a serving cell is the reference cell, the UE is able to acquire a slot number of the reference cell. Therefore, the PRS sequence of the reference cell can be found using Formula 1.

In case that the serving cell is the reference cell, the UE can be aware of an SFN of the reference cell. The UE calculates a frame and a slot, on which a PRS is transmitted, using prs-ConfigurationIndex (contained in assistance data) of the reference cell. The UE receives the PRS using the PRS sequence on the calculated frame and slot and is then able to calculate a TOA of the PRS.

In case that the serving cell is the reference cell, since the UE is always synchronized with the reference cell, the UE can be aware of a start position of a radio frame. Hence, even if the PRS is not used, it is able to calculate the TOA of the PRS using the slot number calculated via the prs-ConfigurationIndex and the start point of the radio frame.

In the following description, in case that a serving cell is a neighbor cell, a method for a UE to measure a TOA of a PRS of a reference cell is described as follows.

First of all, since a UE is already aware of a slot number of a serving cell, the UE can acquire a slot number of a reference cell using the slot number of the serving cell and slotNumberOffset (contained in an OTDOA neighbor cell information list) of the serving cell. Hence, the UE finds a PRS sequence of the reference cell using the slot number of the reference cell and Formula 1.

In case that a serving cell is a neighbor cell, since a UE is not aware of an SFN of a reference cell, even if the UE calculates a frame and a slot on which a PRS is transmitted using prs-ConfigurationIndex, the UE is unable to receive the PRS in the calculated frame and slot. Yet, since the UE is aware of an SFN of the serving cell, the UE is able to calculate a frame and a slot for transmitting a PRS of the serving cell using the prs-ConfigurationIndex of the serving cell included in a neighbor cell information list. In this case, the frame and slot on which the PRS of the serving cell is transmitted can be regarded as a TOA of the PRS of the serving cell. Hence, the UE estimates the TOA of the PRS of the serving cell using the prs-ConfigurationIndex and is then able to acquire a range of a position for receiving a PRS of the reference cell using the TOA of the PRS of the serving cell and the expectedRSTD and expectedRSTD-Uncertainty (contained in the neighbor cell information list) of the serving cell.

Figure 13:
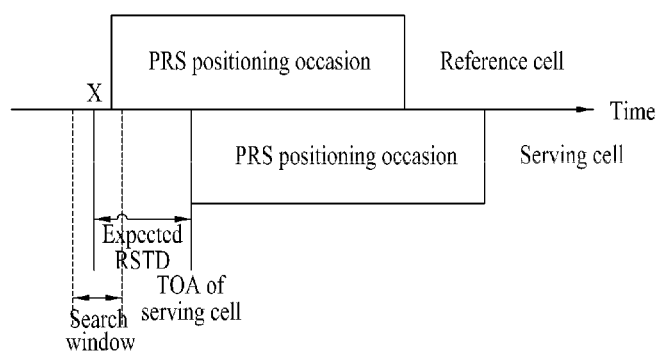
FIG. 13 is a diagram for a range of a position for receiving PRS of a reference cell.

FIG. 13 is a diagram for a range of a position for receiving PRS of a reference cell.

Referring to FIG. 13, a PRS of a reference cell will be received between '(a timing point spaced apart from a TOA of a serving cell by expectedRSTD of the serving cell)−(expectedRSTD-Uncertainty of the serving cell)' and '(a timing point spaced apart from the TOA of the serving cell by the expectedRSTD of the serving cell)+(expectedRSTD-Uncertainty of the serving cell)'. In particular, in FIG. 13, assuming that a timing point spaced apart from the TOA of the serving cell by the expectedRSTD is set to X, a search window becomes [(X−expectedRSTD-Uncertainty of serving cell), (X+expectedRSTD-Uncertainty of serving cell)]. Hence, the UE is able to receive the PRS of the reference cell if searching the search window shown in FIG. 13. In particular, the UE measures the TOA of the PRS by taking a signal received for the search window as a correlation with a PRS sequence of the reference cell.

Referring now to FIG. 7, the UE receives PRSs from the neighbor cells and then measures a TOA of each of the PRSs received from the neighbor cells [S730].

The UE is able to acquire a slot number of the neighbor cell using the slot number of the reference cell found in the step S720 and the slotNumberOffset of the neighbor cell contained in the OTDOA neighbor cell information list. Therefore, the UE finds a PRS sequence of the neighbor cell using the slot number of the neighbor cell and Formula 1.

And, the UE is able to acquire a range of a position for receiving the PRS of the reference cell using the TOA of the PRS of the reference cell found in the step S720 and the expectedRSTD and expectedRSTD-Uncertainty of the neighbor cell contained in the neighbor cell information list.

Figure 14:
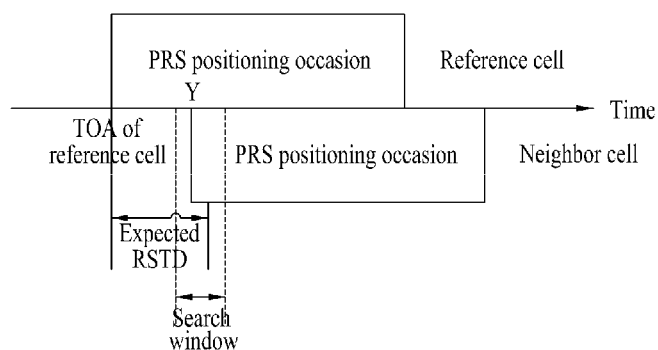
FIG. 14 is a diagram for a range of a position for receiving PRS of a neighbor cell.

FIG. 14 is a diagram for a range of a position for receiving PRS of a neighbor cell.

Referring to FIG. 14, a PRS of a neighbor cell will be received between '(a timing point spaced apart from a TOA of a reference cell by expectedRSTD of the neighbor cell)−(expectedRSTD-Uncertainty of the neighbor cell)' and '(a timing point spaced apart from the TOA of the reference cell by the expectedRSTD of the serving cell)+(expectedRSTD- Uncertainty of the neighbor cell)'. In particular, in FIG. 14, assuming that a timing point spaced apart from the TOA of the reference cell by the expectedRSTD of the neighbor cell is set to Y, a search window becomes [(Y−expectedRSTD−Uncertainty of neighbor cell), (Y+expectedRSTD−Uncertainty of neighbor cell)]. Hence, the UE is able to receive the PRS of the neighbor cell if searching the search window shown in FIG. 14. In particular, the UE measures the TOA of the PRS of the neighbor cell by taking a signal received for the search window as a correlation with a PRS sequence of the neighbor cell.

The UE calculates RSTD for the reference cell of each of the neighbor cells using the ROA of the PRS of the reference cell and the TOA of the PRS of each of the neighbor cells and then transmits the calculated RSTDs to the location server via the base station [S740]. Subsequently, the location server estimates a position or location of the UE using the RSTD for the reference cell of each of the neighbor cells.

Additionally, instead of having a serving cell contained as a reference cell or a neighbor cell in assistance data, a UE is able to calculate RSTD of a plurality of neighbor cells for a reference cell by the above-described method according to the first embodiment of the present invention in a manner of having 'slotNumberOffset, expectedRSTD and expectedRSTD-Uncertainty' of a serving cell and 'slotNumberOffset, expectedRSTD and expectedRSTD-Uncertainty' of a reference cell contained in the assistance data.

If the reference cell and the neighbor cells transmit PRSs at timing points similar to each other, respectively, a value of the expectedRSTD can be limited to a predetermined range. Yet, as the value of the expectedRSTD is limited to the predetermined range, if the reference cell and the neighbor cells fail to transmit PRSs at timing points similar to each other, respectively, the UE is able to receive the PRS of the reference cell only if aware of the SFN of the reference cell. And, the UE is able to receive the PRS of the corresponding neighbor cell only if aware of the SFN of the corresponding neighbor cell. Therefore, the assistance data should contain the information on the SFN of the reference cell and the information on the SFN of the neighbor cell. In this case, the information on the SFN can become a value of the SFN itself or can become an offset between the SFN of the serving cell and the SFN of the corresponding cell. In particular, the location server enables the value of the SFN itself of the reference cell or the offset between the SFN of the serving cell and the SFN of the reference cell to be contained in the OTDOA reference cell information of the assistance data and also enables the value of the SFN itself of the neighbor cell or the offset between the SFN of the serving cell and the SFN of the neighbor cell to be contained in the OTDOA neighbor cell information element.

If the information on the SFN of the reference cell and the information on the SFN of the neighbor cell are contained in the assistance data, the prs-MutingInfo of the reference cell is configured with reference to the SFN of the reference cell and the prs-MutingInfo of the neighbor cell can be configured with reference to the SFN of the neighbor cell. In particular, a first bit of the PRS muting sequence can be defined as corresponding to a first positioning occasion starting after a start point of a frame having a system frame number (SFN) of the corresponding cell set to 0. If so, a PRS configuration index is configured to match an SFN of a reference or neighbor base station that transmits a PRS and PRS muting information is defined with reference to an SFN of a serving cell. Therefore, it is able to solve the problem that the PRS configuration index and the PRS muting information conflict with each other.

In the following description, a method of determining a position of a UE according to a second embodiment of the present invention is explained. According to a second embodiment of the present invention, a UE is able to receive PRSs from a reference cell and neighbor cells in a manner of acquiring SFNs of the reference and neighbor cells by decoding primary broadcasting channels (hereinafter abbreviated P-BCH) of the reference and neighbor cells and using 'prs-ConfigurationIndex' (contained in assistance data) of the reference and neighbor cells or is able to receive a PRS of a reference cell and a PRS of a neighbor cell by blind detection.

In particular, the UE calculates a frame and a slot on which the PRS is transmitted from the reference cell in a manner of receiving the assistance data shown in FIGS. 9 to 12 from the serving cell and then using the prs-ConfigurationIndex of the reference cell contained in the assistance data. The UE then measures a TOA in a manner of finding an SFN of the reference cell by decoding the P-BCH of the reference cell and then receiving the PRS of the reference cell in the calculated slot of the frame. The UE calculates a frame and a slot for the neighbor cell on which the PRS is transmitted using the prs_configurationIndex of the neighbor cell. The UE then measures a TOA in a manner of finding an SFN of the neighbor cell by decoding the P-BCH of the neighbor cell and then receiving the PRS of the neighbor cell in the calculated slot of the frame. Finally, the UE finds a RSTD using the TOA of the PRS of the reference cell and the TOA of the PRS of the neighbor cell.

Alternatively, the UE calculates a frame and a slot for the reference cell to transmit the PRS in a manner of receiving the assistance data shown in FIGS. 9 to 12 from the serving cell and then using the prs-ConfigurationIndex of the reference cell contained in the assistance data. The UE then measures a TOA in a manner of finding an SFN of the reference cell by decoding the P-BCH of the reference cell and then receiving the PRS of the reference cell in the calculated slot of the frame. The user equipment then measures a TOA by receiving the PRS of the neighbor cell by blind detection. Finally, the UE finds an RSTD using the TOA of the PRS of the reference cell and the TOA of the PRS of the neighbor cell.

Alternatively, the UE is able to find a RSTD in a manner of measuring a TOA by receiving the PRS of the reference cell by blind detection, measuring a TOA by receiving the PRS of the neighbor cell by blind detection, and then using the TOA of the PRS of the reference cell and the TOA of the PRS of the neighbor cell.

Thereafter, the UE transmits the RSTD to the serving cell. The serving cell transmits the received RSTD for the reference cell of each of a plurality of the neighbor cells to the location server. Finally, the location server estimates the position or location of the user equipment using the RSTD for the reference cell of each of a plurality of the neighbor cells.

In the following description, a method of determining a position of a UE according to a third embodiment of the present invention is explained.

According to a third embodiment of the present invention, a location server configures prs-ConfigurationIndex of a reference cell and prs-ConfigurationIndex of a neighbor cell with reference to an SFN of a serving cell and then transmits the configured prs-ConfigurationIndex. If so, a UE receives assistance data and then calculates a frame and a slot, in which a PRS of the reference cell is transmitted, using the prs-ConfigurationIndex of the reference cell contained in the received assistance data. Since the calculated frame and slot respectively correspond to frame and slot numbers of the serving cell and the UE is already aware of the SFN of the serving cell, the UE is able to measure a TOA by receiving a PRS of the reference cell on the calculated frame and slot.

Using the prs-ConfigurationIndex of the neighbor cell contained in the received assistance data, the UE calculates a frame and a slot on which a PRS of the neighbor cell was transmitted. In this case, since the calculated frame and slot respectively correspond to frame and slot numbers of the serving cell and the UE is already aware of the SFN of the serving cell, the UE is able to measure a TOA by receiving a PRS of the neighbor cell in the calculated frame and slot.

The UE finds a RSTD using the TOA of the PRS of the reference cell and the TOA of the PRS of the neighbor cell.

The UE transmits the RSTDs to the serving cell. Subsequently, the serving cell transmits the received RSTDs of each of neighbor cells for the reference cell to a location server. The location server estimates a position or location of the UE using the RSTDs of each of the neighbor cells for the reference cell.

In order for the UE to efficiently measure the TOA of the PRS of the reference cell and the neighbor cell, the location server enables the serving cell to be contained as a reference cell or a neighbor cell in the assistance data or enables the slotNumberOffset, expectedRSTD and expectedRSTD-Uncertainty of the serving cell and the reference cell to be contained in the assistance data.

In the following description, a method of determining a position of a UE according to a fourth embodiment of the present invention is explained.

According to a fourth embodiment of the present invention, a location server configures prs-ConfigurationIndex of a reference cell and prs-ConfigurationIndex of a neighbor cell with reference to an SFN of the reference cell and then transmits the configured prs-ConfigurationIndex. If so, a UE receives assistance data and then calculates a frame and a slot, on which a PRS of the reference cell is transmitted, using the prs-ConfigurationIndex of the reference cell contained in the received assistance data.

Subsequently, the UE acquires the SFN of the reference cell by decoding P-BCH of the reference cell and then measures a TOA by receiving the PRS of the reference cell on the calculated frame and slot.

Alternatively, the location server enables such information on the SFN of the reference cell as a value of the SFN of the reference cell itself, an offset between an SFN of a serving cell and the SFN of the reference cell and the like to be contained in the assistance data. If so, the UE finds out the SFN of the reference cell based on the received information on the SFN of the reference cell and then measures a TOA by receiving the PRS of the reference cell in the calculated frame and slot. If the information on the SFN of the reference cell is contained in the assistance data, prs-MutingInfo of the reference cell and the neighbor cell can be configured with reference to the SFN of the reference cell. If so, it is able to solve the problem that the PRS configuration index and the PRS muting information conflict with each other.

Using the prs-ConfigurationIndex of the neighbor cell contained in the assistance data, the UE calculates a frame and a slot on which a PRS of the neighbor cell is transmitted. In this case, since the calculated frame and slot respectively correspond to frame and slot numbers of the reference cell and the UE is already aware of the SFN of the reference cell, the UE is able to measure a TOA by receiving a PRS of the neighbor cell on the calculated frame and slot.

The UE finds a RSTD using the TOA of the PRS of the reference cell and the TOA of the PRS of the neighbor cell.

The UE transmits the RSTD to the serving cell. Subsequently, the serving cell transmits the received RSTD of each of neighbor cells for the reference cell to a location server. The location server estimates a position or location of the UE using the RSTD of each of the neighbor cells for the reference cell.

In order for the UE to efficiently measure the TOA of the PRS of each of the reference cell and the neighbor cell, the location server enables the serving cell to be contained as a reference cell or a neighbor cell in the assistance data or enables the slotNumberOffset, expectedRSTD and expectedRSTD-Uncertainty of each of the serving cell and the reference cell to be contained in the assistance data.

Figure 15:
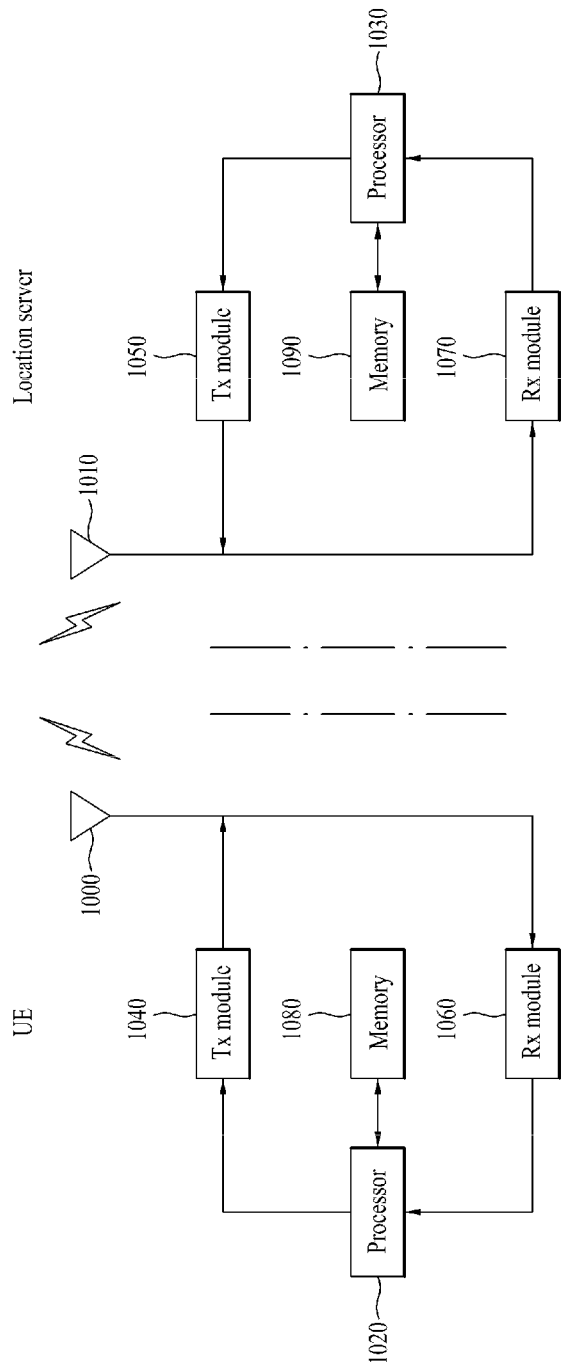
FIG. 15 is a diagram for configurations of transmitter and receiver, in which embodiments of the present invention are implemented.

FIG. 15 is a diagram for configurations of transmitter and receiver, in which the above-described embodiments of the present invention are implemented.

In FIG. 15, the transmitter and the receiver can become a UE or a location server. And, the UE and the location server can communicate with each other via a base station.

Referring to FIG. 15, the transmitter/receiver includes an antenna 1000/1010 capable of transmitting and receiving information, data, signals and/or messages and the like, a transmitting module (Tx module) 1040/1050 transmitting a message by controlling the antenna, a receiving module (Rx module) 1060/1070 receiving a message by controlling the antenna, a memory 1080/1090 storing information associated with communications, and a processor 1020/1030 controlling the transmitting module, the receiving module and the memory.

The antenna 1000/1010 externally transmits a signal generated from the transmitting module 1040/1050. And, the antenna 1000/1010 externally receives a radio signal and then delivers the received radio signal to the receiving module 1060/1070. In case that a multiple-antenna (MIMO) function is supported, at least two antennas can be provided to the transmitter/receiver.

The processor 1020/1030 generally controls overall operations of the transmitter/receiver. In particular, the processor 1020/1030 is able to perform a control function for performing the above-described embodiments of the present invention, a MAC (medium access control) frame variable control function according to service characteristics and propagation environment, a handover function, an authentication function, an encryption function and the like. And, the processor 1020/1030 can further include an encryption module configured to encrypt various messages and a timer module configured to control transmissions and receptions of the various messages.

The processor 1020 of the UE receives a PRS from a reference cell or each of a plurality of neighbor cells using system information received from the location server and then measures an RSTD of each of the neighbor cells for the reference cell.

And, the processor 1030 of the location server determines a position or location of the UE using the RSTD received from the UE.

The transmitting module 1040/1050 performs prescribed coding and modulation on a signal and/or data, which is scheduled by the processor and will be then transmitted externally, and is then able to deliver the coded and modulated signal and/or data to the antenna 1000/1010.

The transmitting module 1050 of the UE transmits the measured RSTD of each of a plurality of the neighbor cells for the reference cell to the location server.

And, the transmitting module 1040 of the location server transmits the system information including information on the reference cell and a plurality of the neighbor cells to the UE.

The receiving module 1060/1070 reconstructs the radio signal received externally via the antenna 1000/1010 into original data in a manner of performing decoding and demodulation on the received radio signal and is then able to deliver the reconstructed original data to the processor 1020/1030.

The receiving module 1070 of the UE receives the system information including the information on the reference cell and a plurality of the neighbor cells from the location server. In this case, the system information enables a cell, from which the UE is able to acquire SFN, to be contained as the reference cell or one of a plurality of the neighbor cells.

And, the receiving module 1060 of the location server receives the RSTD (measured by the UE) of each of a plurality of the neighbor cells for the reference cell from the UE.

The memory 1080/1090 can store programs for processing and control of the processor and is able to perform a function of temporarily storing input/output data (e.g., in case of a mobile station, UL grant allocated by the base station, system information, station identifier (STID), a flow identifier (FID), an action time, region allocation information, frame offset information, etc.).

And, the memory 1080/1090 can include at least one of storage media including a flash memory, a hard disk, a multimedia card micro type memory, a memory card type memory (e.g., SD memory, XD memory, etc.), a RAM (random access memory), an SRAM (static random access memory), a ROM (read-only memory), an EEPROM (electrically erasable programmable read-only memory), a PROM (programmable read-only memory), a magnetic memory, a magnetic disk, an optical disk and the like.

As mentioned in the foregoing description, the detailed descriptions for the preferred embodiments of the present invention are provided to be implemented by those skilled in the art. While the present invention has been described and illustrated herein with reference to the preferred embodiments thereof, it will be apparent to those skilled in the art that various modifications and variations can be made therein without departing from the spirit and scope of the invention. Thus, it is intended that the present invention covers the modifications and variations of this invention that come within the scope of the appended claims and their equivalents. For instance, the respective configurations disclosed in the aforesaid embodiments of the present invention can be used by those skilled in the art in a manner of being combined with one another.

Therefore, the present invention is non-limited by the embodiments disclosed herein but intends to give a broadest scope that matches the principles and new features disclosed herein.

It will be apparent to those skilled in the art that various modifications and variations can be made in the present invention without departing from the spirit or scope of the inventions. Thus, it is intended that the present invention covers the modifications and variations of this invention provided they come within the scope of the appended claims and their equivalents.

What is claimed is:

1. A method of determining a position of a User Equipment (UE) in a wireless communication system, comprising:
   receiving, by the UE from a location server, system information including information on a reference cell for an observed time difference of arrival (OTDOA) and information on at least one neighbor cell for the OTDOA; and
   transmitting, by the UE to the location server, reference signal time difference (RSTD) using positioning reference signals (PRSs) received based on the system information from the reference cell and at least one neighbor cell,
   wherein the system information includes information on a serving cell, for which the UE can obtain a system frame number (SFN), as information on the reference cell or as information on one of the at least one neighbor cell.

2. The method of claim 1, wherein
   the system information includes a slot number offset, an RSTD expected value and uncertainty of the RSTD expected value for the at least one neighbor cell, and
   the slot number offset is an offset between a slot number of the reference cell and a slot number of the at least one neighbor cell, the RSTD expected value is an RSTD value expected to be measured by the UE, and the uncertainty of the RSTD expected value is an error range of the RSTD expected value.

3. The method of claim 1, wherein the system information includes a PRS configuration index for each of the reference cell and at least one neighbor cell that indicates information on when a PRS of a corresponding cell is received.

4. The method of claim 1, further comprising:
   transmitting a message for requesting the system information to the location server.

5. The method of claim 1, further comprising:
   measuring, by the UE, a time of arrival (TOA) of the PRS of the reference cell using the system information;
   measuring, by the UE, a TOA of the PRS of the at least one neighbor cell using the system information; and
   calculating, by the UE, the RSTD of the at least one neighbor cell for the reference cell using the measured TOA of the reference cell and the measured TOA of the at least one neighbor cell.

6. The method of claim 5, wherein
   when the cell for which the UE can obtain the SFN is the reference cell, the step of measuring the TOA of the reference cell includes the step of receiving the PRS of the reference cell using a SFN of the reference cell and a PRS configuration index of the reference cell in the system information, and
   the PRS configuration index of the reference cell indicates information on when the PRS of the reference cell is received.

7. The method of claim 5, wherein
   when the cell for which the UE can obtain the SFN is the at least one neighbor cell, the step of measuring the TOA of the reference cell includes receiving the PRS of the reference cell using a slot number offset, an RSTD expected value and uncertainty of the RSTD expected value for the at least one neighbor cell in the system information,
   the slot number offset is an offset between a slot number of the reference cell and a slot number of the cell for which the UE can obtain the SFN, and
   the RSTD expected value is an RSTD value expected to be measured by the UE, and the uncertainty of the RSTD expected value is an error range of the RSTD expected value.

8. A method of supporting a positioning of a User Equipment (UE) by a location server in a wireless communication system, comprising:
   transmitting, by the location server to the UE, system information including information on a reference cell for an observed time difference of arrival (OTDOA) and information on at least one neighbor cell for the OTDOA; and
   receiving, by the location server from the UE, reference signal time difference (RSTD), measured using positioning reference signals (PRSs) of the reference cell and at least one neighbor cell based on the system information, from the UE, wherein the system information includes information on a serving cell, for which the UE can obtain a system frame number (SFN), as information on the reference cell or as information on one of the at least one neighbor cell.

9. The method of claim 8, wherein the system information includes a slot number offset, an RSTD expected value and uncertainty of the RSTD expected value for the at least one neighbor cell, and the slot number offset is an offset between a slot number of the reference cell and a slot number of the at least one neighbor cell, the RSTD expected value is an RSTD value expected to be measured by the UE, and the uncertainty of the RSTD expected value is an error range of the RSTD expected value.

10. The method of claim 8, wherein the system information includes a PRS configuration index for each of the reference cell and at least one neighbor cell that indicates information on when a PRS of a corresponding cell is transmitted.

11. The method of claim 8, further comprising:

receiving a message for requesting the system information from the UE.

12. A User Equipment (UE) in a wireless communication system, comprising:

a receiver configured to receive system information from a location server, the system information including information on a reference cell for an observed time difference of arrival (OTDOA) and information on at least one neighbor cell for the OTDOA;

a processor configured to measure reference signal time difference (RSTD) using positioning reference signals (PRSs) received based on the system information from the reference cell and at least one neighbor cell; and a transmitter configured to transmit the RSTD to the location server, and wherein the system information includes information on a serving cell, for which the UE can obtain a system frame number (SFN), as information on the reference cell or as information on one of the at least one neighbor cell.

13. The User Equipment of claim 12, wherein the system information includes a slot number offset, an RSTD expected value and uncertainty of the RSTD expected value for the at least one neighbor cell, and the slot number offset is an offset between a slot number of the reference cell and a slot number of the at least one neighbor cell, the RSTD expected value is an RSTD value expected to be measured by the UE, and the uncertainty of the RSTD expected value is an error range of the RSTD expected value.

14. The User Equipment of claim 12, wherein the system information includes a PRS configuration index for each of the reference cell and at least one neighbor cell that indicates information on when a PRS of a corresponding cell is received.

15. The User Equipment of claim 12, wherein the transmitter is configured to transmit a message for requesting the system information to the location server.

16. A location server in a wireless communication system, comprising:

a transmitter configured to transmit system information to a User Equipment (UE), the system information including information on a reference cell for an observed time difference of arrival (OTDOA) and information on at least one neighbor cell for the OTDOA; and a receiver configured to receive, from the UE, reference signal time difference (RSTD), measured using positioning reference signals (PRSs) of the reference cell and at least one neighbor cell based on the system information, wherein the system information includes information on a serving cell, for which the UE can obtain a system frame number (SFN), as information on the reference cell or as information on one of the at least one neighbor cell.

17. The location server of claim 16, wherein the system information includes a slot number offset, an RSTD expected value and uncertainty of the RSTD expected value for the at least one neighbor cell, and the slot number offset is an offset between a slot number of the reference cell and a slot number of the at least one neighbor cell, the RSTD expected value is an RSTD value expected to be measured by the UE, and the uncertainty of the RSTD expected value is an error range of the RSTD expected value.

18. The location server of claim 16, wherein the system information includes a PRS configuration index for each of the reference cell and at least one neighbor cell that indicates information on when a PRS of a corresponding cell is transmitted.

19. The location server of claim 16, wherein the receiver is configured to receive a message for requesting the system information from the UE.

20. The location server of claim 16, further comprising:

a processor configured to determine a position of the UE using the received RSTD.

* * * * *